United States Patent
Konno et al.

(10) Patent No.: US 10,502,288 B2
(45) Date of Patent: Dec. 10, 2019

(54) CHAIN DRIVE DEVICE AND CHAIN GUIDE

(71) Applicant: TSUBAKIMOTO CHAIN CO., Osaka-shi, Osaka (JP)

(72) Inventors: Masahiko Konno, Osaka (JP); Akira Kobara, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 226 days.

(21) Appl. No.: 15/665,582

(22) Filed: Aug. 1, 2017

(65) Prior Publication Data

US 2018/0038459 A1   Feb. 8, 2018

(30) Foreign Application Priority Data

Aug. 4, 2016   (JP) ................................. 2016-153841

(51) Int. Cl.
  *F16H 7/18*   (2006.01)
  *F16H 7/06*   (2006.01)
  *F16H 7/08*   (2006.01)

(52) U.S. Cl.
  CPC ................. *F16H 7/18* (2013.01); *F16H 7/06* (2013.01); *F16H 2007/0872* (2013.01)

(58) Field of Classification Search
  CPC ............... F16H 7/18; F16H 2007/0872; F16H 2007/0804; F16H 2007/0874; F16H 7/08
  USPC .................................................. 474/140, 111
  See application file for complete search history.

(56) References Cited

U.S. PATENT DOCUMENTS

| | | | | |
|---|---|---|---|---|
| 5,779,582 A * | 7/1998 | Mott | .......................... | F16H 7/18 474/140 |
| 7,476,169 B2 * | 1/2009 | Konno | ...................... | F16H 7/18 474/111 |
| 7,479,077 B2 * | 1/2009 | Markley | .................... | F16H 7/08 474/101 |
| 7,597,640 B2 * | 10/2009 | Markley | .................... | F16H 7/18 474/109 |
| 7,628,719 B2 * | 12/2009 | Markley | ............... | F16H 7/0848 474/111 |
| 7,691,018 B2 * | 4/2010 | Haesloop | ............... | F16H 7/0831 474/111 |
| 7,708,662 B2 * | 5/2010 | Uchiyama | ................ | B62M 9/16 474/140 |

(Continued)

FOREIGN PATENT DOCUMENTS

| DE | 102010014943 A1 | 12/2011 |
|---|---|---|
| JP | 2003-329092 A | 11/2003 |

(Continued)

*Primary Examiner* — Henry Y Liu
(74) *Attorney, Agent, or Firm* — Westerman, Hattori, Daniels & Adrian, LLP (57) ABSTRACT

An object of the present invention is to provide a chain drive device that guides a chain favorably with a chain guide to prevent noise generation and wear or damage of various parts with a simple structure, and to provide the chain guide. Provided is a chain drive device 10 having a guide shoe 40 that includes a shoe surface part 41 and a lip 43. The shoe surface part 41 has a larger widthwise dimension than that of the chain 20. The lip 43 has a front-side lip end 44 which has a lip front end face 44a that faces the front side in the chain running direction. The lip front end face 44a has a height that is set larger than a dimensional difference in backside height between inner plates 21 and outer plates 23.

3 Claims, 11 Drawing Sheets

(56) References Cited

U.S. PATENT DOCUMENTS

| | | | | |
|---|---|---|---|---|
| 7,942,769 B2* | 5/2011 | Pflug | F16H 7/18 | 474/111 |
| 7,951,029 B2* | 5/2011 | Oota | F16H 7/18 | 474/111 |
| 7,967,708 B2* | 6/2011 | Hayami | F16H 7/18 | 474/111 |
| 8,007,385 B2* | 8/2011 | Hirayama | F16H 7/18 | 474/111 |
| 8,052,558 B2* | 11/2011 | Markley | F16H 7/0848 | 474/111 |
| 8,052,559 B2* | 11/2011 | Wigsten | F16H 7/0831 | 474/109 |
| 8,387,244 B2* | 3/2013 | Markley | F01L 1/022 | 123/90.31 |
| 8,465,385 B2* | 6/2013 | Konno | F16H 7/08 | 474/101 |
| 8,475,307 B2* | 7/2013 | Bodensteiner | F16H 7/08 | 474/110 |
| 8,550,943 B2* | 10/2013 | Kroon | F01L 1/02 | 474/111 |
| 8,740,737 B2* | 6/2014 | Konno | F16H 7/18 | 474/111 |
| 8,747,263 B2* | 6/2014 | Konno | F16H 7/18 | 474/111 |
| 8,888,628 B2* | 11/2014 | Konno | F16H 7/18 | 474/111 |
| 8,900,079 B2* | 12/2014 | Mori | F16H 7/18 | 474/111 |
| 2006/0172835 A1* | 8/2006 | Konno | F16H 7/18 | 474/111 |
| 2009/0042683 A1* | 2/2009 | Tohara | F16G 13/04 | 474/213 |
| 2009/0325748 A1* | 12/2009 | Pflug | F16H 7/18 | 474/91 |
| 2010/0093475 A1* | 4/2010 | Miyazawa | F16G 13/06 | 474/231 |
| 2012/0157252 A1* | 6/2012 | Yoshida | F16G 13/08 | 474/213 |
| 2012/0316020 A1* | 12/2012 | Miyazawa | F16G 13/06 | 474/230 |
| 2013/0196803 A1* | 8/2013 | Bodensteiner | F16G 13/06 | 474/140 |
| 2013/0225342 A1 | 8/2013 | Yokoyama | | |
| 2014/0213401 A1* | 7/2014 | Konno | F16H 7/18 | 474/140 |
| 2015/0018147 A1* | 1/2015 | Belmer | F16G 13/06 | 474/111 |
| 2015/0240914 A1* | 8/2015 | Kurono | F16G 13/04 | 474/230 |

FOREIGN PATENT DOCUMENTS

| | | |
|---|---|---|
| JP | 4618846 B2 | 1/2011 |
| JP | 2014145398 A | 8/2014 |

* cited by examiner

Related Art

Fig. 9A

Related Art

Fig. 9B

Related Art

Fig. 9C

Related Art

Fig. 10A

Related Art

Fig. 10B

Related Art

Fig. 11A

Related Art

Fig. 11B

Related Art

CHAIN DRIVE DEVICE AND CHAIN GUIDE

BACKGROUND OF THE INVENTION

1. Field of the Invention

The present invention relates to a chain drive device and a chain guide incorporated in a car engine roam or the like.

2. Description of the Related Art

Chain drive devices incorporated in car engine rooms or the like for transmitting power between a crankshaft and camshafts are conventionally known (see, for example, Japanese Patent Application Laid-open No. 2014-14539). The chain drive device includes a chain passing over sprockets attached to the crankshaft and camshafts, and a chain guide that slidably guides the chain.

Figure 9A:
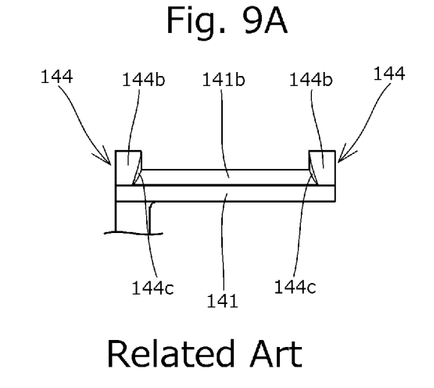
FIGS. 9A, 9B and 9C are an illustrative diagram showing the guide shoe of the conventional chain guide.
Figure 9B:
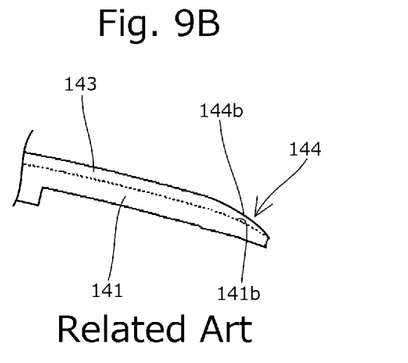
Figure 9C:
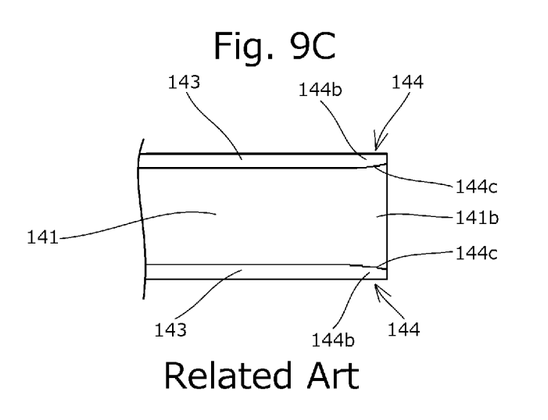

One such chain guide made up of a guide shoe 140 and a guide body (not shown) as shown in FIG. 8 and FIGS. 9A-9C is known. The guide shoe 140 includes a shoe surface part 141 that slidably guides a chain 120A on the upper face thereof, and lips 143 formed on the cuter sides in the width direction of the shoe surface part 141 and protruding upward from the shoe surface part 141 as shown in FIGS. 9A-9C.

At the front end in the chain running direction on the upper face of the shoe surface part 141 is formed, as shown in FIGS. 9A-9C, a shoe surface slope 141b that is slanted up gradually toward the rear side.

In front-side lip ends 144 at the front end in the chain running direction of the lips 143 are formed, as shown in FIGS. 9A-9C, an upper face slope 144b slanted rearward such that it is coplanar with the upper face of the shoe surface part 141 (shoe surface slope 141b) at the front end of the chain guide 130 but becomes gradually higher toward the rear side, and an inner side face slope 144c slanted inward in the width direction toward the rear side.

With these slopes 141b, 144b, and 144c, even when the chain 120A is offset to either side in the width direction when it enters the chain guide 130, the chain 120A can smoothly run into the chain guide as the slopes 141b, 144b, and 144c regulate the motion of the chain 120A.

SUMMARY OF THE INVENTION

Figure 10A:
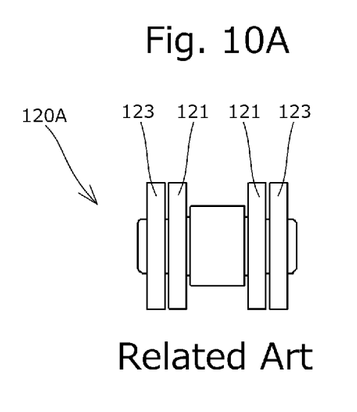
FIGS. 10A and 10B are an illustrative diagram showing a chain.
Figure 10B:
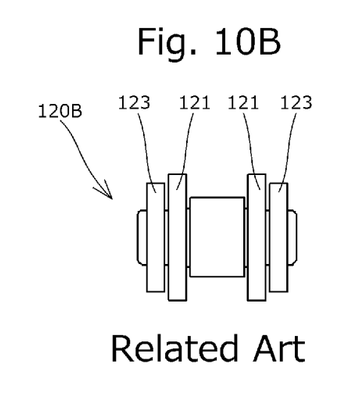

Conventionally, chains with outer plates 123 and inner plates 121 having the same backside height such as the chain 120A shown in FIG. 10A have been the mainstream. However, the trend is shifted recently towards chains with outer plates 123 having a lower backside height than that of the inner plates 121 such as the chain 120B shown in FIG. 10B, in order to reduce the friction resistance between the chain guide 130 and the chain 120. With this chain 120B, the number of plates that make contact with the chain guide 130 when the chain runs can be reduced.

It has been found out, however, that when the chain 120B runs on the chain guide 130 described above, the chain guide 130 cannot favorably guide the chain 120, and there are issues such as noise generation, and wear or damage of the guide shoe 140 and the chain 120.

Figure 11A:
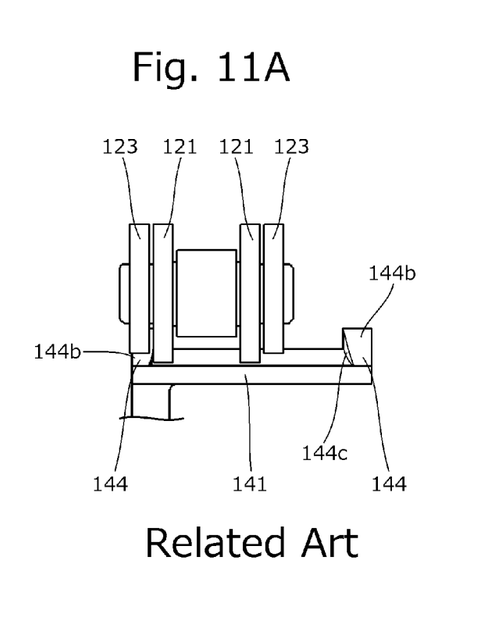
FIGS. 11A and 11B are an illustrative diagram showing a running chain on a conventional guide shoe.

More specifically, first, since the outer plates 123 have a lower backside height than that of the inner plates 121 in the chain 120B, when the chain 120 is offset in the width direction when it enters the chain guide 130 as shown in FIG. 11A, the outer plate 123 is not in contact with the front-side lip end 144, so that, as the chain 120 advances rearward in the chain running direction, the outer plate 123 can readily run onto the lip 143.

Figure 11B:
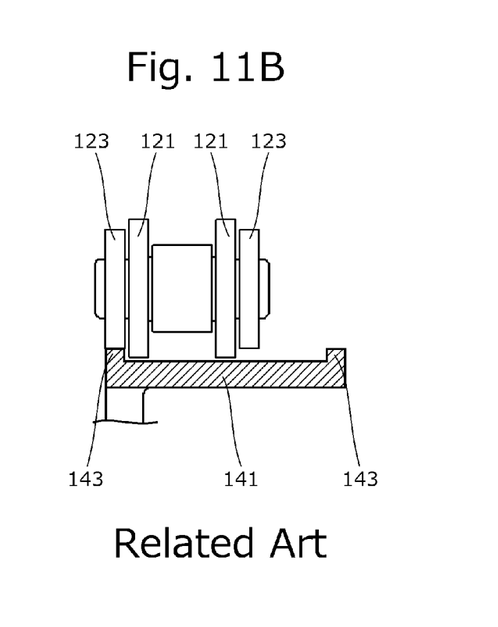

Secondly, when the chain 120B starts to enter the chain guide 130, the inner plates 121 are in contact with the shoe surface part 141 as shown in FIG. 11A. The chain 120 is balanced on the chain guide 130 because of this contact between the shoe surface part 141 and the inner plates 121 until after the chain 120 has advanced rearward in the chain running direction as far as to a point where the outer plate 123 runs onto the lip 143 to cause the inner plates 121 to come off of the shoe surface part 141 as shown in FIG. 11B. The time point when the outer plate 123 drops from the lip 143 to return to the normal running state is delayed accordingly.

Also, since the outer plate is detached from the front-side lip end 144 when the chain 120B is offset in the width direction relative to the chain guide 130 when the chain 120 enters the chain guide, the slopes 144b and 144c on the front-side lip ends 144 will not favorably regulate the motion of the chain 120.

The present invention solves these problems and its object is to provide a chain drive device that guides a chain favorably with a chain guide to prevent noise generation and wear or damage of various parts with a simple structure, and the chain guide.

To solve the problems noted above, the chain drive device of the present invention includes a chain having outer plates with a lower backside height than a backside height of inner plates, and a chain guide having a guide shoe that slidably guides the chain. The guide shoe includes a shoe surface part that slidably guides the chain on an upper face thereof, and a lip formed on an outer side in a width direction of the shoe surface part and protruding upward from the shoe surface part. The shoe surface part has a larger widthwise dimension than a widthwise dimension of the chain. The lip has a front-side lip end on a front side in a chain running direction. The front-side lip end has a lip front end face that faces the front side in the chain running direction, and the lip front end face has a height that is set larger than a dimensional difference in backside height between the inner plates and the outer plates.

To solve the problems noted above, the chain guide of the present invention includes a guide shoe that slidably guides a chain having outer plates with a lower backside height than a backside height of inner plates. The guide shoe includes a shoe surface part that slidably guides the chain, and a lip formed on an outer side in a width direction of the shoe surface part and protruding upward from the shoe surface part. The shoe surface part has a larger widthwise dimension than a widthwise dimension of the chain. The lip has a front-side lip end on a front side in a chain running direction. The front-side lip end has a lip front end face that faces the front side in the chain running direction, and the lip front end face has a height that is set larger than a dimensional difference in backside height between the inner plates and the outer plates.

The term "chain pitch" used herein refers to the distance in the chain running direction (longitudinal direction of the chain) between the centers of the pair of front and rear connecting pins coupled to the outer plates.

The term "backside height" herein refers to a dimension in the normal direction of a pitch line of the chain from the pitch line to an end face of the plate facing the chain guide.

The term "pitch line" used, herein refers to the line connecting the centers of the pair of front and rear connecting pins coupled to the outer plates in the chain running direction.

The term "widthwise dimension of the chain" herein refers to the dimension between the outer side faces of outer plates disposed on both outer sides in the width direction.

According to one aspect of the present invention, the front-side lip end of the lip has a lip front end face that faces the front side in the chain running direction, and the lip front end face has a height that is set larger than a dimensional difference in backside height between the inner plates and the outer plates. Even when the chain is offset in the width direction when it enters the chain guide, the outer plate will hardly run on the front-side lip end, so that not only resultant noise generation and wear or damage of various parts can be prevented but also the following effects can be achieved:

Namely, even when the outer plate runs on the front-side lip end because of looseness in the chain resulting from the chordal action or the like that occurs as the chain mates with a sprocket, the inner plates will be lifted from the upper face of the shoe surface part immediately after the chain has gone into the chain guide because the height of the lip front end face is set larger than the dimensional difference in backside height between the inner plates and the outer plates. This causes the chain to lose its balance and the outer plate will soon drop from the lip so that the chain can go back to its normal running state.

Also, because of the height set larger than the dimensional difference in backside height between the inner plates and the outer plates, the outer side face of the outer plate is brought into contact with the inner side face slope of the front-side lip end to guide the chain inward in the width direction even when the chain is offset widthwise when it enters the chain guide.

With the lip front end face being set high, the difference in height between the front-side lip end and the rear part of the lip is smaller, so that the upper face slope of the front-side lip end can have a smaller curvature (larger radius of curvature), and thereby the impact when the outer plates collide against the upper face slope of the front-side lip end can be reduced.

According to another aspect of the present invention, the lip front end face is formed flat, so that the outer plates can be prevented from running onto the front-side lip end more reliably as compared to when the lip front end face is curved.

According to another aspect of the present invention, the dimension of the upper face slope of the front-side lip end in the chain running direction is set shorter than the chain pitch, so that the outer plate can be dropped from the lip onto the upper face of the shoe surface part soon after the chain has gone into the chain guide.

According to another aspect of the present invention, the dimension of the inner side face slope of the front-side lip end in the chain running direction is set shorter than the chain pitch, so that the position of the chain in the width direction relative to the chain guide can be corrected soon after the chain has gone into the chain guide and therefore deflection of the chain running on the chain guide can be minimized.

DESCRIPTION OF THE PREFERRED EMBODIMENT

A chain drive device 10 according to one embodiment of the present invention will be hereinafter described with reference to the drawings.

Figure 1:
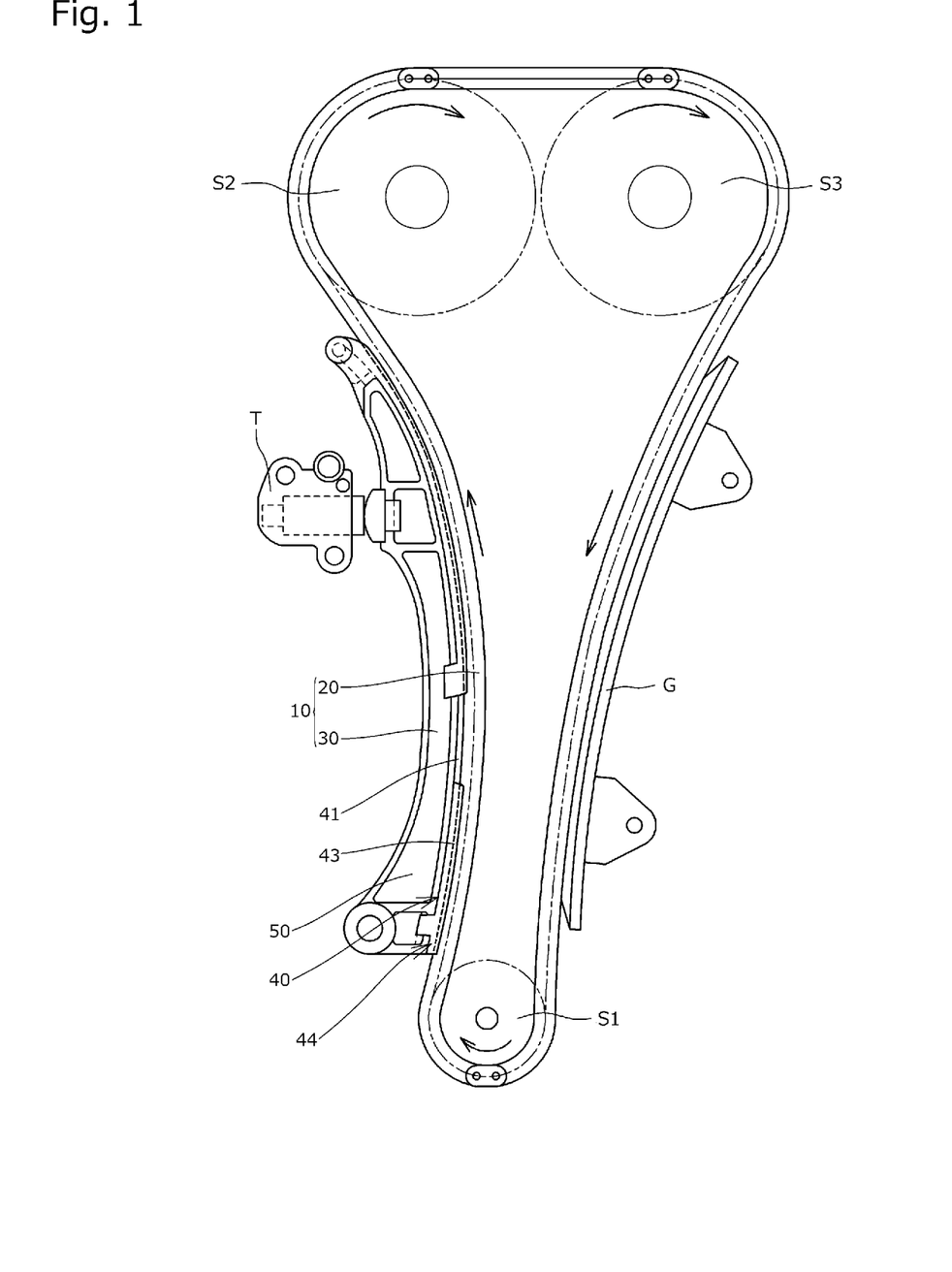
FIG. 1 is an illustrative diagram showing a timing system in which a chain drive device according to one embodiment of the present invention is incorporated.

The chain drive device 10 is incorporated in a timing system installed in an engine room for transmitting power between a crankshaft with a sprocket S1, and camshafts with sprockets S2 and S3, as shown in FIG. 1.

The chain drive device 10 includes, as shown in FIG. 1, a chain 20 that is a timing chain passing over sprockets S1 to S3, and a chain guide 30 that slidably guides the chain 20 for causing the chain 20 to run stably and that is pressed against the chain 20 by a tensioner T to keep an appropriate tension of the chain 20.

Figure 2A:
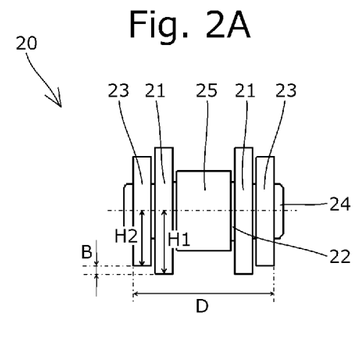
FIGS. 2A, 2B and 2C are an illustrative diagram showing a chain.
Figure 2B:
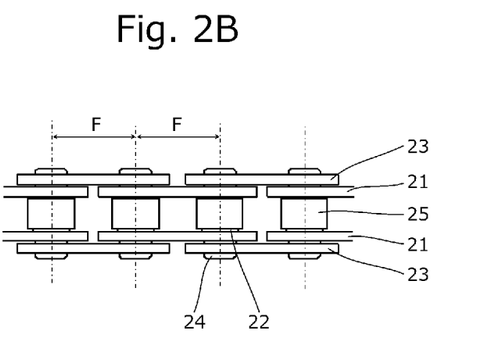
Figure 2C:
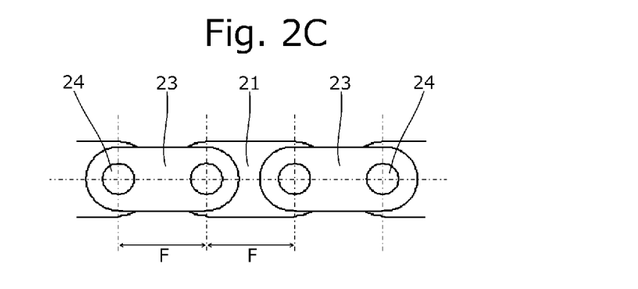

The chain 20 is configured as a roller chain and includes, as shown in FIGS. 2A-2C, a plurality of inner links each made up of a pair of front and rear cylindrical bushings 22 connected to a pair of left and right inner plates 21, a plurality of outer links each made up of a pair of front and rear connecting pins 24 connected to a pair of left and right outer plates 23 arranged on outer sides in the width direction of the inner plates 21, and rollers 25 fitted on the bushings 22. These plurality of inner links and outer links are alternately and pivotably connected to each other along the longitudinal direction of the chain by inserting the connecting pins 24 in the bushings 22.

The chain guide 30 is made of a synthetic resin material and includes, as shown in FIG. 1 or FIGS. 3A-3C, a guide shoe 40 that slidably guides the chain 20, and a guide body 50 pivotable on an engine block and supporting the guide shoe 40 over the length in the chain running direction.

Figure 3A:
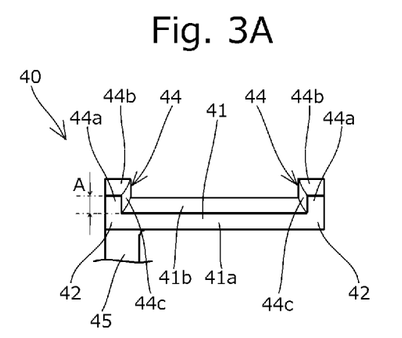
FIGS. 3A, 3B and 3C are an illustrative diagram showing a guide shoe of the chain guide.
Figure 3B:
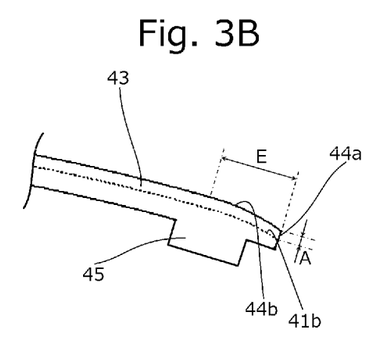
Figure 3C:
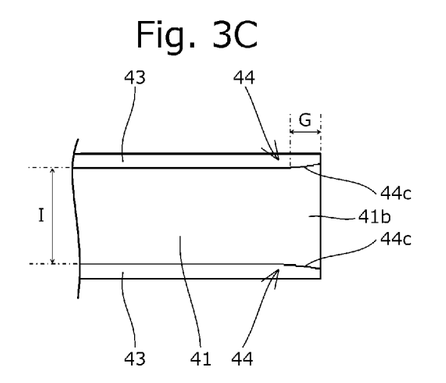

The guide shoe 40 includes, as shown in FIGS. 3A-3C, a shoe surface part 41 that slidably guides the chain 20 on the upper face thereof, side portions 42 continuously formed on both outer sides in the width direction of the shoe surface part 41, lips 43 protruding upward from the shoe surface part 41, and an engagement portion 45 used for attaching the guide shoe 40 to the guide body 50. The lips 43 are formed on outer sides in the width direction of the shoe surface part 41, more specifically, continuously with the upper face of the side portions 42.

The shoe surface part 41 includes a shoe front end face 41a, which is a flat surface facing the front side in the chain running direction as shown in FIGS. 3A-3C.

At the front end in the chain running direction on the upper face of the shoe surface part 41 is formed a shoe surface slope 41b that is slanted relative to the chain running direction (pitch line) gradually up toward the rear side in the chain running direction.

The lip 43 includes a front-side lip end 44 on the front side in the chain running direction (where the chain 20 comes in) as shown in FIGS. 3A-3C.

The front-side lip end 44 includes a lip front end face 44a that is a flat surface facing the front side in the chain running direction, an upper face slope 44b extending from the upper edge of the lip front end face 44a toward the rear side in the chain running direction, and an inner side face slope 44c extending from an inner edge of the lip front end face 44a toward the rear side in the chain running direction.

The lip front end face 44a is coplanar with the shoe front end face 41a as shown in FIGS. 3A-3C. The lip front end face 44a and the shoe front end face 41a are substantially vertical relative to the chain running direction (pitch line).

The upper face slope 44b is slanted relative to the chain running direction (pitch line) up toward the rear side and upwardly rounded. The upper face slope 44b has a constant radius of curvature, which is different from the radius of curvature of the part further rear of the upper face slope 44b.

The inner side face slope 44c is slanted relative to the chain running direction (pitch line) inward in the width direction toward the rear side and inwardly rounded in the width direction. The inner side face slope 44c has a constant radius of curvature, which is different from the radius of curvature of the part further rear of the inner side face slope 44c.

Other surfaces on the rear side of the lips 43 (upper face, inner side face, and outer side face) other than the front-side lip end 44 may be formed by flat and curved surfaces combined as required.

The lips 43 including the front-side lip ends 44 may be designed to have the same height throughout, or varying heights along the chain running direction.

In this embodiment, the lips 43 may be formed at suitable points in the chain running direction of the chain guide 30.

Next, the dimensional relationship between various parts of the chain 20 and the guide shoe 40 will be explained below.

First, the backside height H2 of the outer plates 23 is set lower than the backside height H1 of the inner plates 21.

Figure 4A:
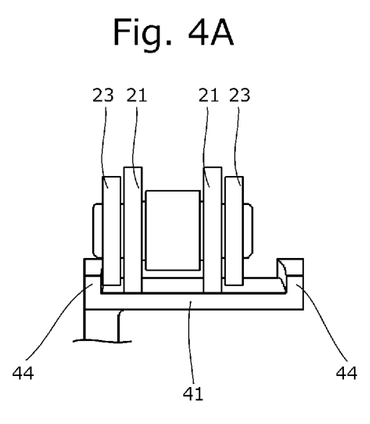
FIGS. 4A and 4B are an illustrative diagram showing a running chain on the guide shoe as viewed from the chain running direction.
Figure 4B:
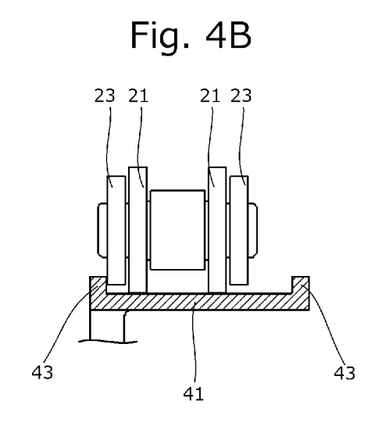

The widthwise dimension I of the shoe surface part 41 (i.e., the dimension I between the inner side faces of the lips 43) is set larger than the widthwise dimension D of the chain 20 (i.e., the dimension D between outer side faces of the outer plates 23), as shown in FIG. 2 to FIG. 4.

The height A of the lip front end face 44a from the upper face of the shoe surface part 41 is set larger than the dimensional difference B in backside height between the inner plates 21 and outer plates 23.

The dimension E of the upper face slope 44b in the chain running direction is set shorter than the chain pitch F.

Figure 5A:
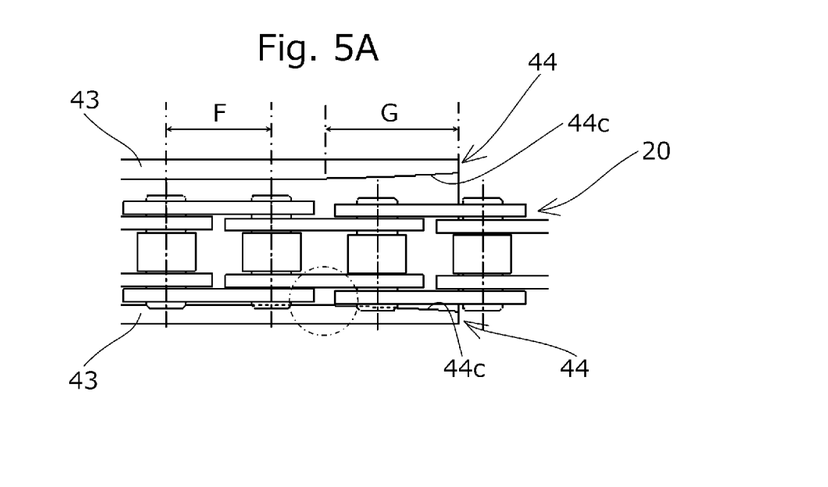
FIGS. 5A and 5B are an illustrative diagram showing a running chain on the guide shoe as viewed from above.
Figure 5B:
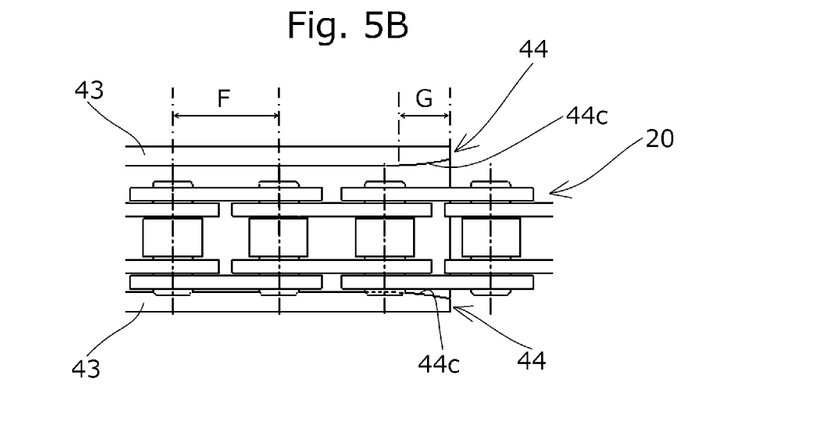

The dimension G of the inner side face slope 44c in the chain running direction is set shorter than the chain pitch F. By setting the dimension G shorter than the chain pitch F, deflection of the chain 20 that tends to happen when the dimension G is longer than the chain pitch F as shown in FIG. 5A can be avoided.

While one embodiment of the present invention has been described in detail, the present invention is not limited to the above-described embodiment and may be carried out with various design changes without departing from the scope of the present invention set forth in the claims.

For example, while the chain 20 was described as a chain incorporated in a car engine or the like in the embodiment above, the purpose of use of the chain 20 is not limited to this application, and may be used as any type of drive chains, conveyor chains, and the like.

While the chain 20 was described as a roller chain in the embodiment above, the chain 20 may have any other forms as long as it includes inner plates 21 and outer plates 23, such as a bushing chain, for example. While the chain in the embodiment described above has one inner link in the width direction, the chain may include a plurality of inner links arranged in the width direction.

The chain guide 30 is not limited to the specific form of the embodiment described above and may have any design as long as it includes a lip 43 at least on one of the outer sides in the width direction of the side surface part 41, and various design changes may be made.

For example, while the chain guide 30 is configured as a pivotally supported pivot guide, the chain guide 30 may be configured as a fixed guide G fixedly installed in the engine room.

While the chain guide 30 is configured with two components, i.e., the guide shoe 40 and the guide body 50 in the embodiment described above, the chain guide may be made of a single component.

Figure 6:
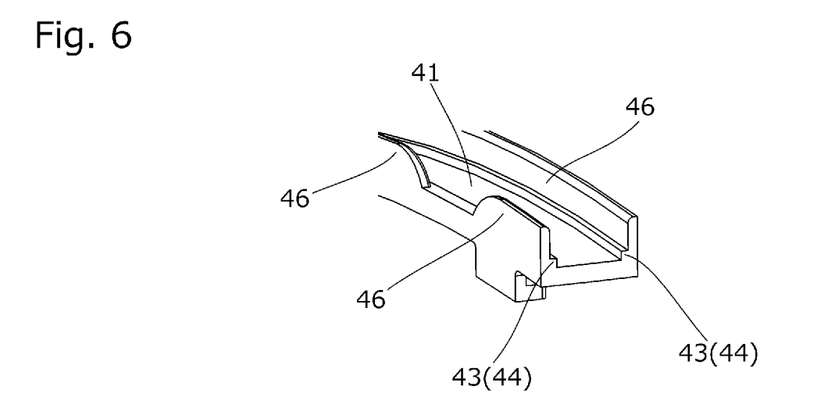
FIG. 6 is an illustrative diagram showing a first modified example of the guide shoe.

Side walls 46 higher than the lips 43 may be formed at least on one of the outer sides in the width direction of the left and right lips 43 as shown in FIG. 6. In this case, a wrong fit inside the engine during assembly can be prevented.

Figure 7:
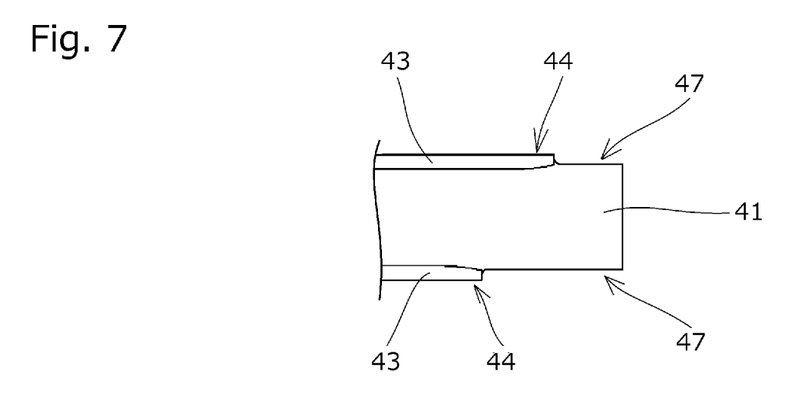
FIG. 7 is an illustrative diagram showing a second modified example of the guide shoe.
Figure 8:
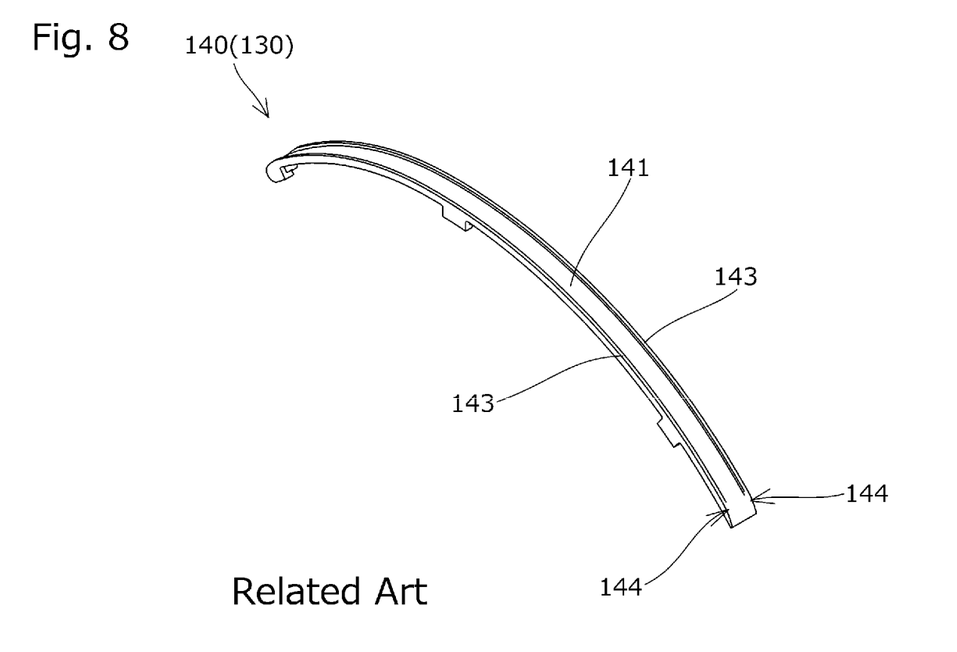
FIG. 8 is a perspective view showing a guide shoe of a conventional chain guide.

Moreover, notched portions 47 may be provided by cutting off part of the side portion 42 shoe surface part 41 as shown in FIG. 7 in order to avoid interference with protrusions or the like an the engine block.

The chain guide 30 of the present invention has been described in the embodiment above for guiding the chain 20 that has outer plates 23 with a lower backside height H2 an the backside height H1 of the inner plates 21. Alternatively, chains having inner plates 121 and outer plates 123 with the same backside height such as the chain 120A shown in FIG. 10A may be guided by the chain guide 30 of the present invention.

What is claimed is:

1. A chain drive device comprising:
   a chain having outer plates with a lower backside height than a backside height of inner plates; and
   a chain guide having a guide shoe that slidably guides the chain,
   the guide shoe including a shoe surface part that slidably guides the chain on an upper face thereof, and a lip formed on an outer side in a width direction of the shoe surface part and protruding upward from the shoe surface part,
   the shoe surface part having a larger widthwise dimension than a widthwise dimension of the chain,
   the lip having a front-side lip end on a front side in a chain running direction,
   the front-side lip end having a lip front end face as a flat surface that faces the front side in the chain running direction, and
   the lip front end face as the flat surface having a height that is set larger than a dimensional difference in backside height between the inner plates and the outer plates,
   the front-side lip end including an upper face slope extending from an upper edge of the lip front end face toward a rear side in the chain running direction,
   the upper face slope being slanted relative to a pitch line of the chain up toward the rear side, and the upper face slope having the height that is set larger than the dimensional difference in backside height between the inner plates and the outer plates, and a dimension of the upper face slope in the chain running direction being set shorter than a chain pitch.

2. The chain drive device according to claim 1, wherein the shoe surface part includes a shoe front end face that is a flat surface facing the front side in the chain running direction, and the lip front end face is coplanar with the shoe front end face.

3. The chain drive device according to claim 1, wherein the front-side lip end includes an inner side face slope extending from an inner edge of the lip front end face toward a rear side in the chain running direction, and a dimension of the inner side face slope in the chain running direction is set shorter than a chain pitch.

\* \* \* \* \*